Aug. 10, 1965   E. H. FROHBIETER   3,199,305
ICE MAKER POWERED BY SUPPLY WATER PRESSURE
Filed May 2, 1962   6 Sheets-Sheet 1
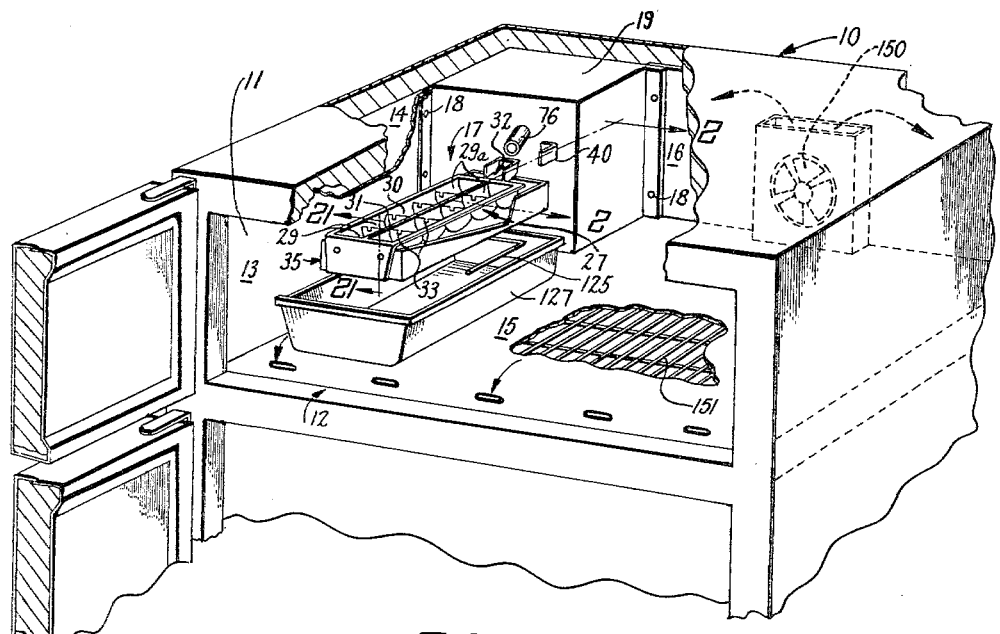
FIG. 1
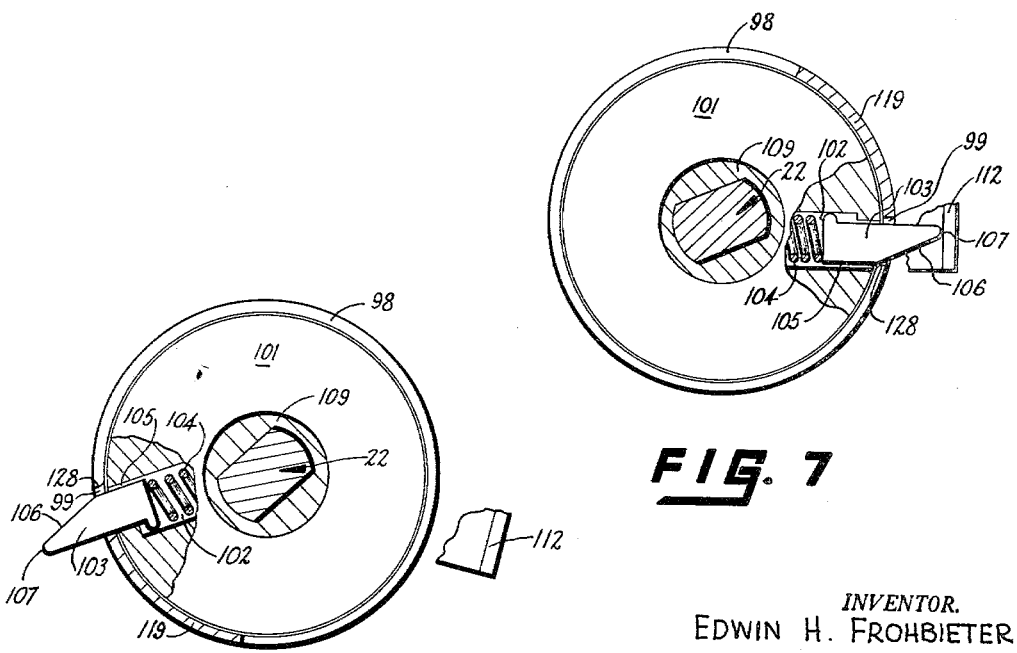
FIG. 7
FIG. 6
INVENTOR.
EDWIN H. FROHBIETER
BY
Donald W. Thomas
Agent Aug. 10, 1965   E. H. FROHBIETER   3,199,305
ICE MAKER POWERED BY SUPPLY WATER PRESSURE
Filed May 2, 1962   6 Sheets-Sheet 2

INVENTOR.
EDWIN H. FROHBIETER
BY
Donald W. Thomas
Agent

Aug. 10, 1965  E. H. FROHBIETER  3,199,305
ICE MAKER POWERED BY SUPPLY WATER PRESSURE
Filed May 2, 1962  6 Sheets-Sheet 3
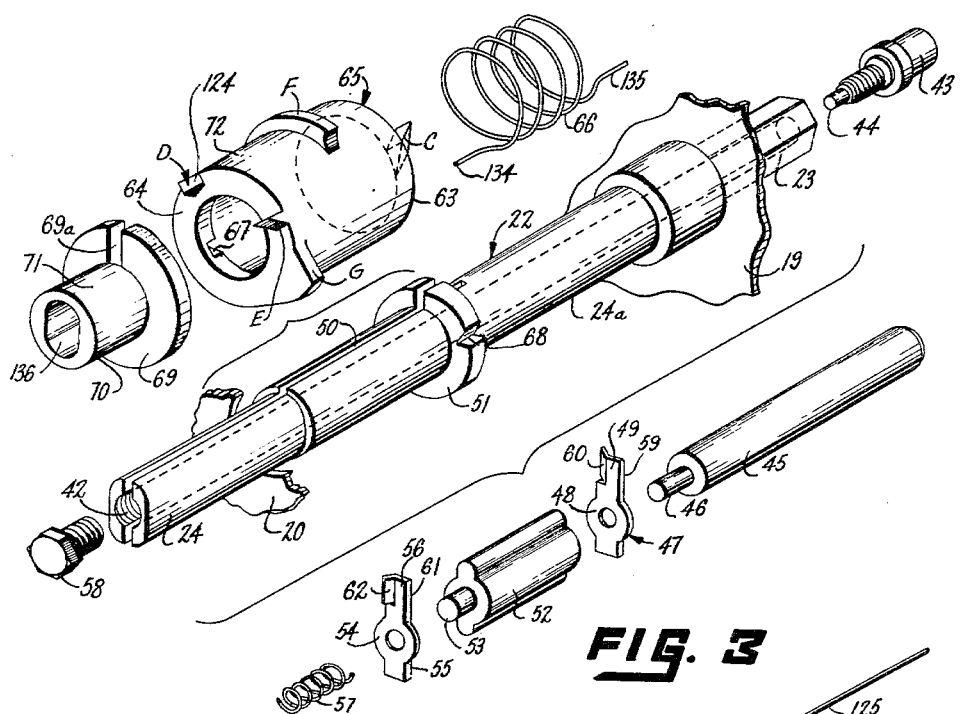
FIG. 3
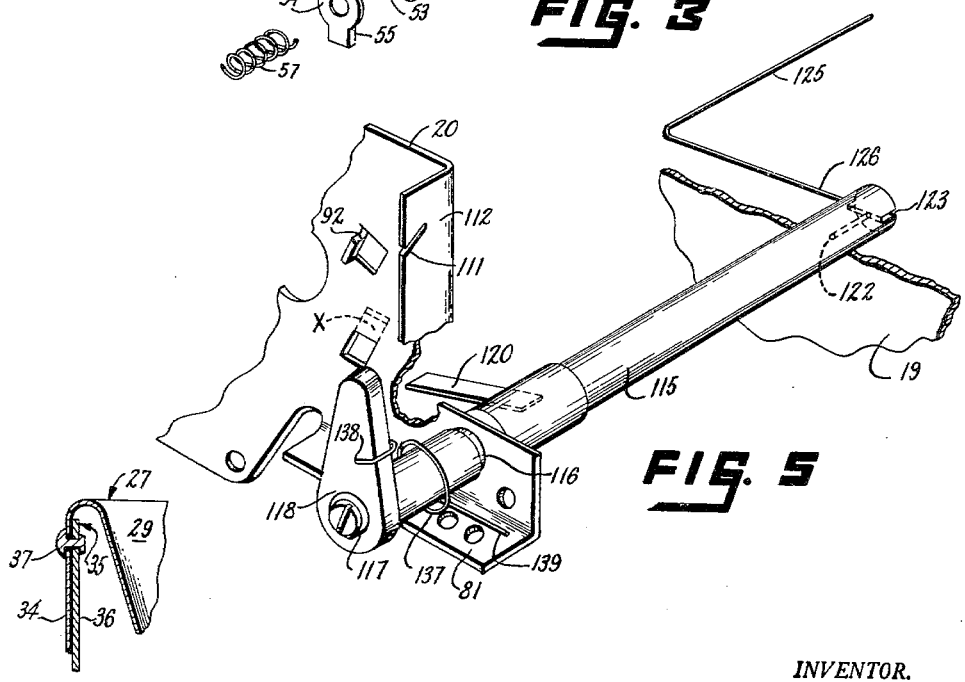
FIG. 5
FIG. 21
INVENTOR.
EDWIN H. FROHBIETER
BY
Donald W. Thomas
Agent Aug. 10, 1965   E. H. FROHBIETER   3,199,305
ICE MAKER POWERED BY SUPPLY WATER PRESSURE
Filed May 2, 1962   6 Sheets-Sheet 4
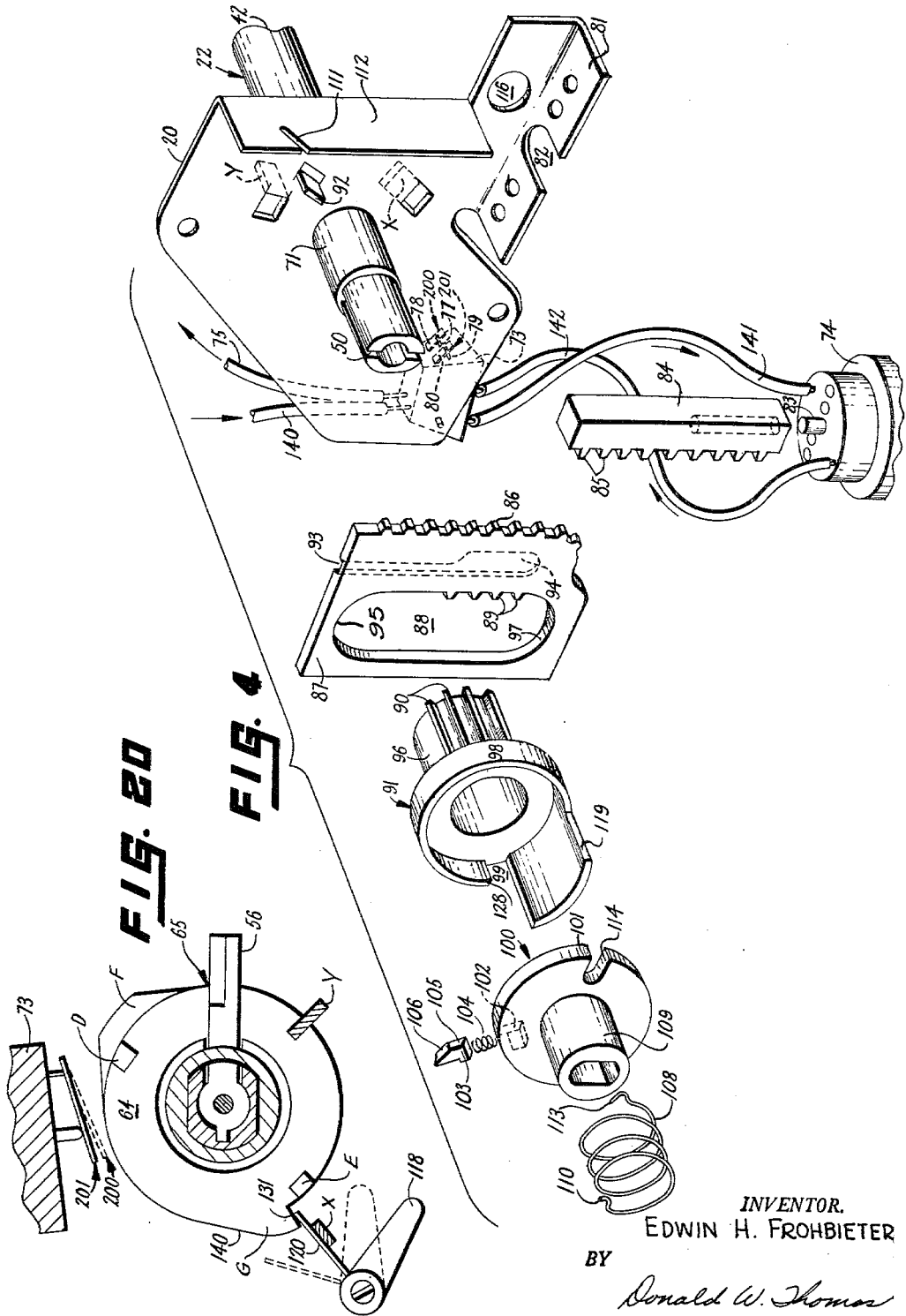
INVENTOR.
EDWIN H. FROHBIETER
BY
Donald W. Thomas
Agent

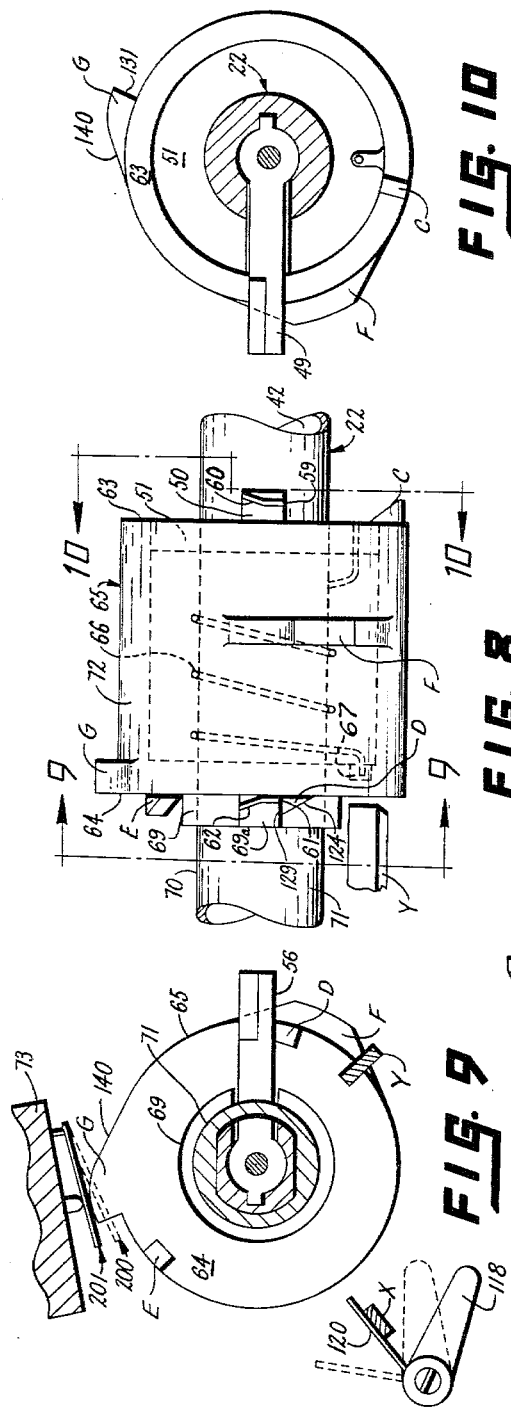

Aug. 10, 1965  E. H. FROHBIETER  3,199,305
ICE MAKER POWERED BY SUPPLY WATER PRESSURE
Filed May 2, 1962  6 Sheets-Sheet 6
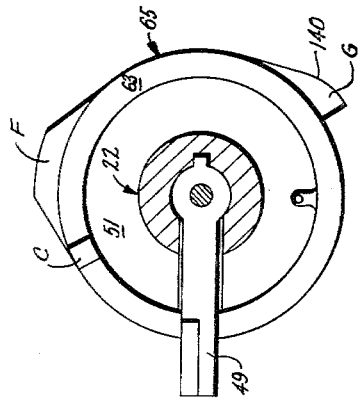
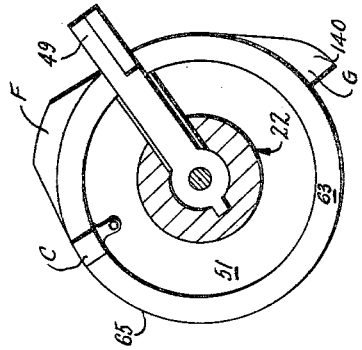
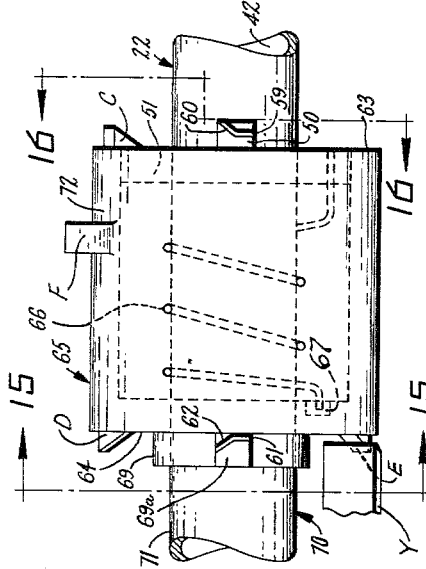
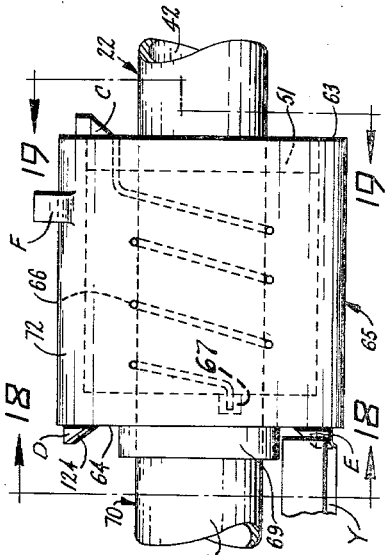
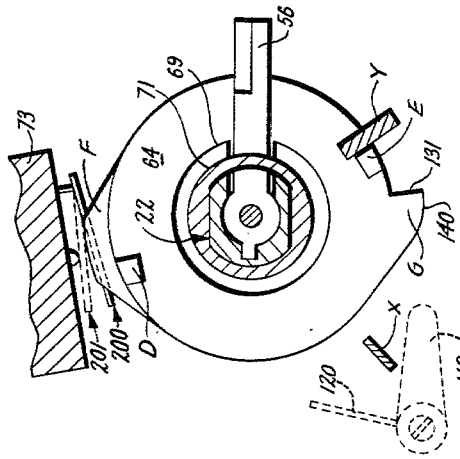
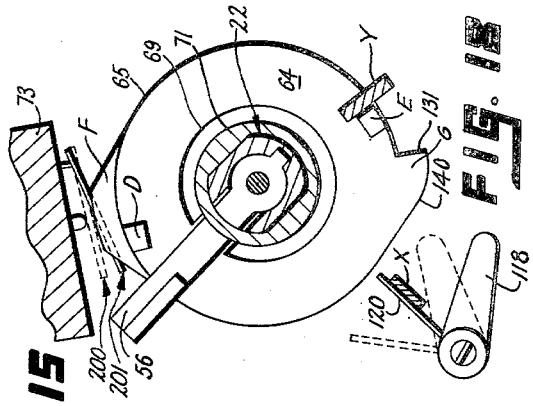
INVENTOR.
BY EDWIN H. FROHBIETER
Donald W. Thomas
Agent

United States Patent Office 3,199,305
Patented Aug. 10, 1965

3,199,305
ICE MAKER POWERED BY SUPPLY
WATER PRESSURE
Edwin H. Frohbieter, Evansville, Ind., assignor to Whirlpool Corporation, a corporation of Delaware
Filed May 2, 1962, Ser. No. 191,817
12 Claims. (Cl. 62—135)

This invention pertains to an ice making apparatus and more specifically to an automatic ice maker for use in the freezing compartment of a conventional household refrigerator.

In the past, numerous attempts have been made to design a compact, reliable and economical ice maker for use in refrigerators. In order to meet the reliability requirement, previous ice makers have had control systems which were elaborate, complicated and extremely expensive. These control systems contained numerous electrical components including timing motors, switches and thermostats all of which added to the cost.

Another problem encountered in the known ice makers is the relatively complex and costly means provided therein for ejecting the ice bodies from the mold. Such ejecting means conventionally include either drive motors which must be large enough to provide the relatively substantial forces necessary to break the ice bodies free from the mold walls or large, expensive heaters which inherently cause meltage of the ice bodies and increase the freezing time.

The present invention comprehends a new and improved ice making apparatus effectively eliminating each of the above discussed problems. The principal feature of the present invention is, therefore, the provision of a new and improved ice body maker.

A further feature of the invention is the provision of such an ice making apparatus having a resilient mold which is partially inverted and then twisted to effectively free the ice bodies from the mold walls and allow them to fall freely into the collecting means. This ice body releasing means is provided with a unique, improved drive means which is powered by the pressure of the water which is subsequently delivered to the mold for freezing.

Another feature of the invention is the provision of mold drive means which includes means for increasing the driving torque at the time the mold begins to twist thereby giving the mold a greater amount of twist and insuring the release of the ice bodies from the mold walls.

A further feature of the invention is the provision of such an ice making apparatus having improved, simplified and economical mechanical control means which requires no expensive electrical components whatsoever. The control means of this invention includes means thermally responsive to the freezing of the ice bodies in the mold to initiate the hydraulically operated drive means.

Another feature of the invention is the provision of an ice body maker including a resilient mold to be twisted supported at one end and provided with a mold surrounding frame attached to the opposite end wherein stop means interrupt the rotation of the frame but permit continued rotation of the one end whereby the mold is twisted without the need for a space consuming outboard support of the mold.

Still another feature of the invention is the provision of an ice making apparatus having new and improved means for controlling the operation thereof as a function of the level of ice bodies in the collecting means.

Other features and advantages of the invention will be apparent from the following description of one embodiment thereof taken in conjunction with the accompanying drawings.

FIGURE 1 is a fragmentary perspective view of a refrigeration device, specifically a refrigerator, embodying the invention.

FIGURE 3 is an exploded, rearwardly looking isometric view of the ice maker drive shaft together with a portion of its associated parts shown in disassembled relationship.

FIGURE 4 is an exploded, rearwardly looking isometric view of the ice maker drive shaft together with those associated parts to the rear of the mounting plate shown in disassembled relationship.

FIGURE 5 is an exploded, rearwardly looking isometric view of the ice level control mechanism of the invention.

FIGURE 6 is a fragmentary vertical sectional view taken substantially along line 6—6 of FIGURE 2.

FIGURE 7 is a fragmentary vertical sectional view generally similar to that of FIGURE 6 but showing the structure rotated to another position.

FIGURE 8 is a fragmentary plan view taken substantially along line 8—8 of FIGURE 2 showing the position of the cam and shaft during entry of water to the mold.

FIGURE 9 is a rear view of the structure shown in FIGURE 8 taken substantially along line 9—9 thereof.

FIGURE 10 is a front view of the structure shown in FIGURE 8 taken substantially along line 10—10 thereof.

FIGURE 11 is a plan view generally similar to that of FIGURE 8 but showing the position of the cam and shaft in the reset position.

FIGURE 12 is a rear view of the structure shown in FIGURE 11 taken substantially along line 12—12 thereof.

FIGURE 13 is a front view of the structure shown in FIGURE 11 taken substantially along line 13—13 thereof.

FIGURE 14 is a plan view generally similar to that of FIGURE 8 but showing the position of the cam and shaft at the beginning of the ice ejection cycle and after the cam has initiated the drive means.

FIGURE 15 is a rear view of the structure shown in FIGURE 14 taken substantially along line 15—15 thereof.

FIGURE 16 is a front view of the structure shown in FIGURE 14 taken substantially along line 16—16 thereof.

FIGURE 17 is a plan view generally similar to that of FIGURE 8 but showing the position of the cam and shaft at the end of the ice ejection cycle wherein the mold is in a twisted, semi-inverted position.

FIGURE 18 is a rear view of the structure shown in FIGURE 17 taken substantially along line 18—18 thereof.

FIGURE 19 is a front view of the structure shown in FIGURE 17 taken substantially along line 19—19 thereof.

FIGURE 20 is a view similar to FIGURE 9 but showing the position of the cam and shaft when operation of the ice maker is shut off by the control mechanism.

FIGURE 21 is a fragmentary vertical sectional view taken substantially along line 21—21 of FIGURE 1.

Figure 2:
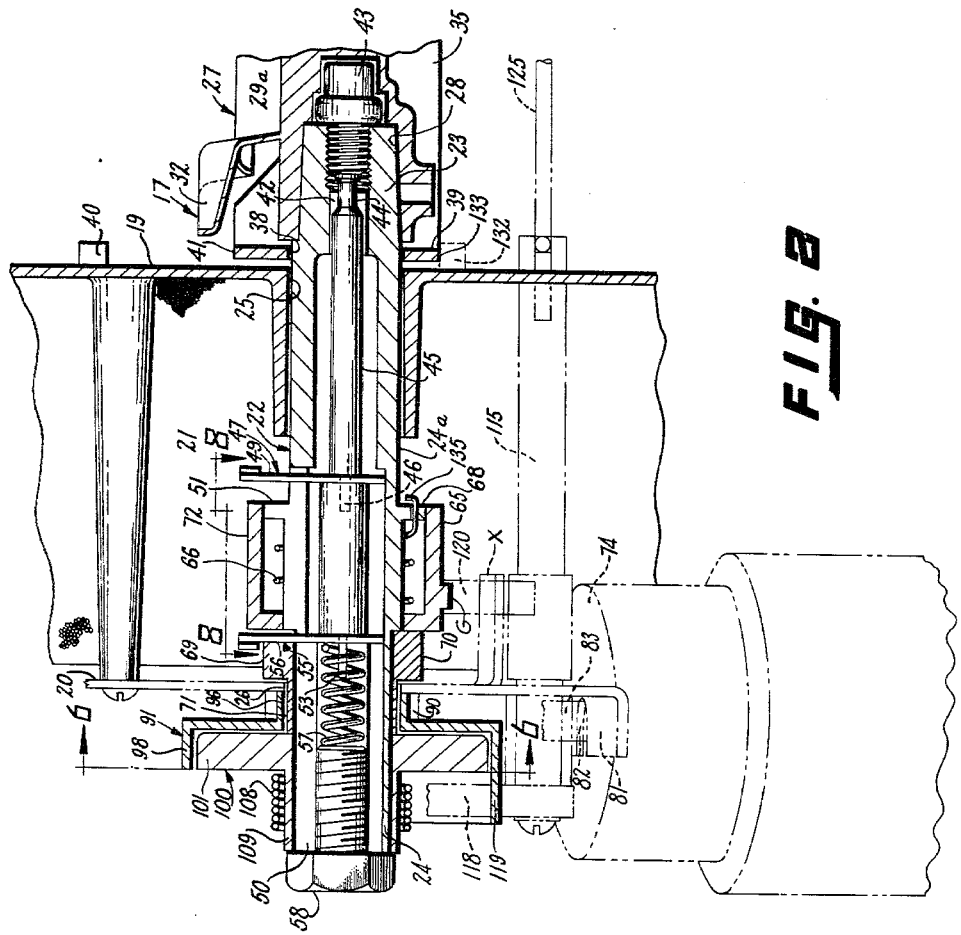
FIGURE 2 is a fragmentary vertical sectional view taken substantially along line 2—2 of FIGURE 1 wherein the broken line portions of the drawing are elements of the invention which are assembled ahead of the section line 2—2.

As seen in FIGURE 1, the ice maker of this invention is normally located in a two-temperature refrigerator 10 having a below freezing chamber 11 defined by a liner 12 having side walls 13, top wall 14, bottom wall 15, and back wall 16, and having a front access opening. The liner back wall 16 contains an opening for receiving the rear portions of ice maker assembly 17. A plurality of screws 18 hold the ice maker assembly 17 in its assembled position within the liner 12.

The two-temperature refrigerator 10 has a refrigerant liquefier including a compressor and a condenser (not shown) as well as an evaporator 151. The compressor, the condenser and the evaporator are all connected in a closed series loop providing a path for refrigerant flow. In the preferred embodiment a fan 150 and a duct are associated with the evaporator and the chamber 11 in such a manner as to provide cold, below freezing air to the chamber 11.

The ice maker assembly 17 is supported at the front by a molded plastic housing 19 which is attached to the liner side and back walls 13 and 16. A stamped metal mounting plate 20 is spaced rearwardly of and attached to the houseing 19 and serves to support the rear elements of the ice maker assembly 17 as seen in FIGURE 2. The space between the housing 19 and the mounting plate 20 is filled with a pre-formed polyurethane foam insulation block 21. Thus with the addition of insulation between housing 19 and mounting plate 20 the sub-freezing air within chamber 11 is precluded from reaching the rearmost elements of the ice maker assembly 17, which includes, among other things, a water storage chamber which for proper operation must necessarily be in an above freezing atmosphere.

Certain parts of the ice maker assembly 17 are located on or in a hollow plastic shaft 22, as shown in FIGURE 2, which extends transverse to the housing 19 and mounting plate 20 and has a forward portion 23 which extends into the below freezing chamber 11, a rear portion 24 which extends rearwardly of mounting plate 20 and a central portion 24a therebetween. Opening 25 in housing 19 and opening 26 in mounting plate 20 provide front and rear bearings for the rotatable shaft 22.

A molded polyethylene ice body mold 27, is positioned on the forward portion 23 of the shaft 22. The forward portion 23 of the shaft 22 has five flat portions and a sixth rounded portion which engage a similarly shaped opening 28 within mold 27. Thus the mold 27 is keyed to the shaft 22 for rotation therewith and, because of the rounded side on shaft forward portion 23, the mold is always properly angularly aligned relative to the shaft. In the embodiment shown in FIGURE 1, the plastic mold has relatively thin wall sections which thus allow the tray to be deformed by a twisting force. The interior of the mold is divided into ten cavities 29 which are formed in part by the intersection of four transverse webs 30 with a single longitudinal dividing wall 31. A water trough 32 is formed in the rear end of the mold 27 for the purpose of directing water into the two rearmost cavities 29a. Water entering cavities 29a is permitted to flow into the remaining eight cavities through weirs 33 provided in each of the transverse and longitudinal walls 30 and 31. As seen in FIGURE 21, the forward end of mold 27 is provided with a skirt 34 which provides a mounting surface for the fornt end 36 of a metal mold frame 35, this front end 36 being rigidly attached to the skirt 34 by two screws 37. The four-sided mold frame 35 completely encircles the outer perimeter of the mold 27. As best seen in FIGURE 2, the rear wall 39 of mold frame 35 is provided with an opening 38 through which a cylindrical portion of the shaft 22 passes. Thus with this arrangement, the front end 36 of the mold frame is rigidly mounted to the front portion of the mold 27 whereas the rear portion of the mold 27 is free to rotate relative to the rear wall 39 of the mold frame 35. As shown in FIGURE 2, a stop 40 is provided on the housing 19 for the purpose of intersecting the upper edge 41 of the rear wall 39 of the mold frame at a preselected angle of rotation of the mold frame 35 away from the horizontal. In addition, a second stop 132 projects from the housing 19 and intersects the bottom edge 133 of rear wall 39 whenever the mold is in a horizontal position.

The shaft 22 contains an opening 42 which extends longitudinally throughout the entire length of the shaft. A thermal motor 43 is threadably engaged into the forward end of opening 42. The thermal motor 43 extends forwardly of the extreme end of the shaft 22 and in its assembled position shown in FIGURE 2 rests within opening 28 of the mold 27 and is adjacent the bottom wall of both cavities 29a for sensing the temperature of the contents of these cavities. The thermal motor 43 has a movable member 44 which moves rearwardly upon an increase in the temperature of the medium surrounding the forward end of the thermal motor 43 and which moves forwardly upon a decrease in the temperature of the medium surrounding the thermal motor.

The longitudinal opening 42 in the shaft has assembled within it a plurality of parts which are intended to move in response to the movement of member 44 of the thermal motor. These parts which are to be now described are shown in their assembled position in FIGURE 2 and for additional clarity are shown in an unassembled perspective view in the lower right-hand portion of FIGURE 3. Immediately to the rear of movable member 44 and in contact therewith is a push rod 45 which is assembled entirely within the opening 42 in the shaft. The rear end 46 of push rod 45 is reduced in diameter and engages an opening within a front latch arm 47. A circular portion 48 of the latch arm 47 is located within the opening 42 of the shaft. An elongated finger 49 extends radially outwardly from the circular portion 48 through a slot 50 in the central portion 24a of the shaft. As best seen in FIGURE 3, slot 50 runs parallel to central opening 42 in the shaft 22 and is in communication therewith. The slot 50 extends forwardly from the rear end of the shaft 22 up to and slightly beyond circular barrier 51. Thus the finger portion 49 extends beyond the outside diameter of the shaft and is keyed by its confinement within slot 50 so as to rotate with the shaft 22. As will be seen later, the slot 50 allows the front latch arm 47 to move forwardly and rearwardly in response to the urging of push rod 45.

Immediately to the rear of the front latch arm 47 and abutting the circular portion 48 thereof is a latch arm follower 52 which extends rearwardly through the central opening 42 in the shaft 22. The forward end of the latch arm follower 52 contains an opening which receives the rear end 46 of the push rod. Thus the front latch arm 47 is positively located between the push rod 45 and the latch arm follower 52. The rear end 53 of latch arm follower 52 is of reduced diameter and fits into an opening within the circular portion 54 of a rear latch arm 55. As in the case of the front latch arm 47, the rear latch arm 55 also has its circular portion 54 within the opening 42 in shaft 22 and likewise has an elongated finger portion 56 extending radially outwardly from the circular portion through the slot 50. Thus in effect, the shaft 22 carries a pair of latch arms 47 and 55 which rotate with the shaft, which are spaced apart by the latch arm follower 52 and which can move together longitudinally both forwardly and rearwardly in response to the condition of the thermal motor 43. In order that all of the parts within the opening 42 in the shaft 22 move as an assembly, a compression spring 57 is assembled within the opening 42 and constantly urges the assembled parts forwardly toward the movable member 44 of the thermal motor 43. The rear end of spring 57 is confined by screw 58 which is threadably engaged into the rear end of shaft 22. The forward end of spring 57 encircles the rear end 53 of the latch arm follower and abuts the circular portion 54 of the rear latch arm 55. Thus, as previously stated, the purpose of the spring 57 is to allow push rod 45, front latch arm 47, latch arm follower 52 and rear latch arm 55 to move forwardly or rearwardly in response to contraction or expansion of the thermal motor 43.

As seen in FIGURE 3, the finger portion 49 of the front latch arm has a square abutting surface 59 and an inclined surface 60, and likewise the finger portion 56 of rear latch arm 55 has a square abutting surface 61 and also an inclined surface 62. These abutting and inclined surfaces of the two latch arms are intended to cooperate with a plurality of projections which extend from the front surface 63 and the rear surface 64 of a circular cam 65, cam 65 being assembled concentrically with and around the outside surface of the shaft 22. Those parts assembled on the outside of the shaft 22 and located between mounting plate 20 and the circular barrier 51 are shown assembled in FIGURE 2 but for clarity are also shown in perspective in the upper left-hand corner of FIGURE 3. Thus as best seen in FIGURE 2, the cam 65 is assembled between the two latch arms 47 and 55. The cam 65 is not keyed to the shaft but rather has a resilient connection with the shaft because of its connection to the shaft by torsion spring 66. The spring 66 has a rear end 134 attached in recess 67 on the interior of the cam, a front end 135 attached to the shaft 22 in depression 68 of circular barrier 51 and a central portion encircling the outer diameter of shaft 22. Because of this spring connection between the cam 65 and the shaft 22, the cam will move with the shaft whenever it is not prevented from doing so by interference with other components of the ice maker assembly.

Whereas the longitudinal movement of the front latch arm 47 is confined to the slot area 50 forward of the circular barrier 51, the movement of the rear latch arm 55 is confined to the slot area 69a of the enlarged portion 69 of a cam spacer 70. The cam spacer 70 has a non-circular opening 136 which assembles over the rear portion of shaft 22 and is keyed for movement therewith. A reduced circular portion 71 extends rearwardly from enlarged portion 69 through the central opening 26 in the mounting plate 20 for bearing engagement therewith.

A detailed description of the cam 65 now follows. As seen in FIGURE 3, the front surface 63 of the cam contains a projection C which selectively engages finger 49 of the front latch arm, the operation of which will be described later. The rear surface 64 of the cam contains angularly spaced projections E and D located about the periphery of the surface 64. Projection D selectively engages the finger 56 of the rear latch arm and projection E selectively engages stop Y on mounting plate 20. The outer cylindrical surface 72 of the cam which is transverse to the front and rear surfaces 63 and 64 includes two outwardly extending cam surfaces F and G for controlling the inlet and outlet valves, respectively.

As seen in FIGURE 4, a plunger type valve asembly 73 is mounted on the forward surface of the mounting plate 20 and below the central axis of shaft 22. The valve assembly 73 contains two valves. The first of these valves is an inlet valve 200 which controls the flow of water from the main water supply to the water storage chamber 74 via tubes 140 and 141. The second of these valves is an outlet valve 201 which controls the flow of water from the water storage chamber 74 to the mold 27 via connecting tubes 75 and 142 and water outlet tube 76, the latter tube 76 extending through the foam insulation block 21 and terminating in chamber 11 slightly above water trough 32. The inlet valve 200 has a spring loaded plunger 77 which is actuated by a hinge lever arm 78. Likewise, outlet valve 201 has a spring loaded plunger 79 which is actuated by a similar hinged lever arm 80. The hinged lever arms 78 and 80 normally ride on the cylindrical surface 72 of the cam 65 and are selectively engaged by their respective cam surfaces, F and G, depending upon the angular position of the cam. Thus the inlet valve is opened when the hinged lever arm 78 is depressed by cam surface F on cam 65. Likewise, the outlet valve is opened whenever the cam surface G on cam 65 depresses hinged lever arm 80 which thus depresses spring loaded plunger 79.

A description now follows of those parts of the ice maker which are assembled to the shaft 22 and located to the rear of mounting plate 20. The assembled relationship of these parts is shown in FIGURE 2 whereas the individual parts are shown in greater detail in the unassembled perspective view of FIGURE 4.

The mounting plate 20 has two forwardly extending lugs, namely, X and Y. Long lug X projects forwardly into an area adjacent the surface of cam 65 and cooperates with the ice maker shut-off assembly as will be later described in detail. Shorter lug Y extends into the path of movement of projection E which is located on the rear surface 64 of the cam 65 and hence acts as a stop on the cam during a certain portion of the ice dumping cycle.

The water storage chamber 74 is attached by screws to a horizontal, rearwardly extending flange 81 formed as part of the mounting plate 20. An opening 82 in flange 81 provides clearance for the spring loaded plunger 83 which moves upwardly whenever water enters the storage chamber 74 and is spring biased downwardly whenever the water leaves the storage chamber and passes to the mold 27. The plunger 83 fits into a central opening within a gear rack 84, the rack having a plurality of teeth 85 which generally extend toward the shaft 22. The teeth 85 on rack 84 normally engage a set of oppositely disposed teeth 86 formed on an outer edge of a transfer rack 87. The transfer rack 87 has a rather large central opening 88, a portion of this opening having a plurality of teeth 89 which operatively engage the peripheral teeth 90 which are molded on the cylindrical forward portion 96 of a drive gear 91. A tab 92 extending rearwardly from mounting plate 20 engages a slot 93 which is formed in the front face of the transfer rack 87. The configuration of slot 93 is such that most of the motion of the transfer rack is vertical because of the close engagement of the tab 92 with the slot 93. However, whenever the tab 92 reaches the enlarged portion 94 of slot 93, the transfer rack is free to rotate. It will be noted that the lower teeth 86 on transfer rack 87 are formed on a curvature in order to permit this rotation of the transfer rack to occur.

In summary, the plunger 83 provides a vertical force which is transferred to rack 84 wherein its teeth 85 cooperatively engage the teeth 86 of the transfer rack thereby imparting movement to the transfer rack. The transfer rack in turn has internal teeth 89 about central opening 88 which operatively engage the drive gear teeth 90 thereby transmitting motion to the drive gear. Whenever the water storage chamber 74 is empty, the plunger 83 is retracted into the body of the water storage chamber of the transfer rack and the upper curvature 95 of central opening 88 is in contact with the cylindrical forward portion 96 of drive gear 91. Upon movement of the plunger 83 vertically upwardly, the rack 84 causes the transfer rack to likewise move upwardly whereupon the drive gear is rotated due to the engagement of its teeth 90 with the teeth 89 on transfer rack 87. As the drive gear 91 rotates its position within the central opening 88 of the transfer rack constantly changes until such time as the cylindrical forward portion 96 of the drive gear 91 engages the bottom curvature 97 of the opening 88. When the drive gear 91 has bottomed on the transfer rack opening 88, further upward movement of the rack 84 causes rotation of both the drive gear 91 and the transfer rack 87, thus the need for having lower teeth on a curvature and also the need for having loose cooperation between tab 92 and slot 93 durnig the latter stages of plunger movement.

The drive gear 91 has a longitudinal opening throughout its length which slidably fits over the reduced circular portion 71 of cam spacer 70 in an unkeyed relationship. In addition to the forward portion 96 which contains teeth 90, the drive gear 91 has a cylindrical, cup-shaped rear portion 98. The cylindrical surface of this cup-shaped portion is interrupted by a slot 99. A drive disc 100 having a relatively narrow circular portion 101 is assembled within the cup-shaped rear portion 98 of drive gear 91. A groove 102 in the circular portion 101 of the drive disc contains an L-shaped pawl 103 which is biased outwardly by a compression spring 104. When assembled, the pawl 103 and compression spring 104 are retained in position on one side by the circular portion 101 and on the other side by the drive gear 91. As seen in FIGURES 4, 6 or 7, the pawl 103 has a flat surface 105 which blends into a tapered surface 106 and terminates in a rounded point 107. The drive disc 100 which is assembled over the rear portion 24 of the shaft 22 is keyed to the shaft and rotates therewith. The pawl 103 normally, due to the urging of compression spring 104, engages the slot 99 in cup portion 98. Under these conditions, rotation of the drive gear causes like rotation of the shaft 22.

A mold return spring 108 encircles the rear portion 109 of the drive disc 100 as seen in FIGURE 2. The rear end 110 of the spring engages a slot 111 located on the vertically extending flange 112 of mounting plate 20 and the forward end 113 of the spring is retained within groove 114 located on the outer periphery of circular portion 101 of the drive disc. The mold return spring 108 normally biases the shaft and hence the mold 27 in the horizontal freezing position wherein tray frame 35 engages stop 132 on the housing 19. Thus, whenever the drive gear 91 in cooperation with the drive disc 100 rotates the mold 27 toward its ice dumping position, the mold return spring is being wound and it subsequently unwinds to return the mold to the horizontal position when the drive disc 100 is disengaged from the drive gear 91, the detail of which will be described later.

In ice makers of the type described, ice level control means are normally provided which sense a level of ice bodies within the storage receptable. Upon sensing a preselected level of ice bodies within the storage receptacle, the control means will render the ice maker ineffective and preclude dumping of additional ice into the storage receptacle until the user has sufficiently reduced the number of ice bodies in the receptacle. As best seen in FIGURE 5, the ice level control mechanism of this invention involves the use of a control arm shaft 115 which is spaced from and is parallel to the shaft 22, the control arm shaft 115 being supported at the front by housing 19 and at the rear by opening 116 in the mounting plate 20. Attached to the rear end 117 of the control arm shaft is a lifting arm 118 which is keyed to the control arm shaft and transmits rotational forces thereto. The outer portion of the lifting arm 118 normally engages a cam surface 119 which is a partial extension of the cup-shaped rear portion 98 of the drive gear 91. Thus rotation of the drive gear in one direction causes opposite rotation of the lifting arm 118 due to its engagement with the cam surface 119.

Forwardly of the mounting plate 20 an elongated flat spring 120 is rigidly assembled within a groove in the control arm shaft 115 and extends radially outwardly therefrom toward the cam 65. The flat spring 120, as shown in FIGURE 20, is located in relation to the cam 65 so as to selectively engage the sharp cut-off portion 131 of outlet valve cam surface G located on the cam. The extreme forward end of the control arm shaft 115 which extends slightly beyond the housing 19 on into the below freezing chamber 11 has a central opening 122 and a groove 123 running transverse to the opening 122. One end of a control arm wire 125 fits snugly within opening 122 and portion 126 of the control arm fits into groove 123 to thereby key the control arm wire 125 with the control arm shaft 115. Thus any rotation of the control arm shaft imparted to it by rotation of the drive gear 91 causes like rotation of the control arm wire 125.

The control arm wire 125 is normally biased downwardly into the receptacle 127 due to the forces imparted to the control arm shaft 115 by a torsion spring 137. As seen in FIGURE 5, spring 137 has a rear end 138 which engages lifting arm 118 and a forward end 139 which engages the upper surface of flange 81 of the mounting plate. Thus, due to the urging of spring 137, the lifting arm is in constant engagement with the cam surface 119 except at those times when an accumulation of ice within the receptacle 127 precludes such engagement as will be described later.

*Operation*

Basically the operation of the ice maker of this invention is as follows. An ice body mold 27 is horizontally disposed in the below freezing chamber 11 whereupon a charge of water is automatically supplied to the individual cavities 29 of the mold. A thermal motor 43 is adjacent a pair of mold cavities and senses the temperature of the contents therein. Upon freezing of the water into ice, the movable member 44 of thermal motor 43 has moved sufficiently forwardly to allow the latch mechanism, fingers 49 and 56, to release the cam 65 whereupon the inlet water valve 200 is allowed to open and water enters the water storage chamber 74 through tubes 140 and 141. As previously explained, the pressure of the water entering chamber 74 imparts a rotational force to the drive gear 91 which through its cooperation between pawl 103 and the drive disc 100 causes the shaft 22 and hence the mold to rotate clockwise as seen in FIGURE 1 toward a substantially vertical dumping position. After 100° of rotation by the mold, the rear wall 39 of the mold frame 35 intersects stop 40 on the housing 19. The shaft 22 causes the rear end of the mold 27 to rotate with respect to its front end which is rigidly fastened to the front end 36 of the mold frame. An additional 25°–28° of clockwise rotation by the shaft produces sufficient twisting of the mold to assure release of the ice bodies within the mold and subsequent delivery of these ice bodies to the storage receptacle 127. At this particular point in the operation of the ice maker the pawl 103 is disengaged from the drive gear 91 and the mold return spring 108, which was wound up during the previous clockwise rotation, is allowed to take over and return the released shaft 22 and its associated members including the mold to the horizontal position. During this return to the horizontal position the latch mechanism engages the cam 65 and causes torsion spring 66 to be rewound. By the time the mold return spring 108 has returned the mold all the way back to the horizontal position against stop 132, the cam 65 is so positioned as to cause the outlet valve 201 to be opened whereupon water within the water storage chamber 74 is caused to flow into and through connecting tubes 75 and 142, through water outlet tube 76, into the mold water trough 32 and finally into each of the cavities 29 of the mold 27. The above freezing temperature of the incoming water is sufficient to cause movable member 44 of thermal motor 43 to move rearwardly and to reset the latching mechanism whereby the ice maker assembly 17 is again ready to eject the ice bodies as soon as the thermal motor 43 has contracted sufficiently to indicate a frozen condition of the water within the mold.

The operation of driving the shaft 22 by the pressure of the incoming water into water storage chamber 74 by cooperation of plunger 83, rack 84, transfer rack 87 and drive gear 91 has been previously explained. However, further explanation is required as to why a transfer rack is required. During the first 100° of rotation of the mold, the shaft 22 is working against very little force. It is during this first 100° of rotation that the drive gear 91 is being driven by the cooperation of teeth 90 on the drive gear with the teeth 89 located on the transfer rack 87. The moment arm under this condition is substantially the pitch diameter of the gear teeth 99 of drive gear 91. During the next succeeding 25°–28° of rotation of shaft 22, the mold 27 is being twisted and hence the shaft is undergoing a substantial increase in force. It is, therefore, desirable during this period of rotation to increase the moment arm and thus improve the mechanical advantage to offset this increased force being imposed on shaft 22. As stated previously, when drive gear 91 bottoms on curvature 97 of rack 87, both the drive gear and transfer rack commence to rotate simultaneously and at this point the effective moment arm is substantially the pitch diameter of the lower teeth 86 located on the curved, outer edge of transfer rack 87. Thus, it is readily apparent that the mechanical advantage is substantially increased during the time when the mold is being twisted.

After the mold 27 has been twisted sufficiently to insure release of all of the ice bodies from the cavities, it is a requirement that the drive gear 91 be released from the drive disc 100 so as to allow the mold return spring 108 to rotate the shaft and hence the mold back to its horizontal position. The only connection between the drive gear 91 and the shaft 22 is the interference of the sides of slot 99 within the drive gear and the pawl 103. During most of the rotation of shaft 22 when pawl 103 is engaged within slot 99, the trailing edge 128 of slot 99 being in tight engagement with the flat surface 105 of the pawl 103 as is best seen in FIGURE 6. As the shaft 22 nears 125°–128° of rotation, the rounded point 107 of the pawl strikes the vertical flange 112 on the mounting plate 20 as seen in FIGURE 7. Further rotation of the shaft 22 causes the pawl 103 to be depressed within the groove 102 against the forces of the compression spring 104. When the pawl 103 has been retracted sufficiently within groove 102, the trailing edge 128 of slot 99 begins to ride on tapered surface 106 of the pawl. When this happens, the trailing edge 128 is itself able to cause the pawl to move inwardly within groove 102 until such time as the rounded point 107 on the pawl rides on the inner surface of the cup-shaped portion 98 of the drive gear, at which point the pawl 103 rides clear of slot 99 and the shaft 22 is free to rotate independently of the drive gear.

As described above, rotation of the mold counterclockwise, as seen in FIGURE 1, back to its horizontal position locates the cam surface G so as to cause the outlet valve 201 to be opened and allow water to enter the mold. As the water leaves the water storage chamber 74, the spring loaded plunger 83 moves vertically downwardly taking with it rack 84 and transfer rack 87 which thus rotates the drive gear in the counterclockwise direction. When all of the water has left the storage chamber 74 the drive gear 91 has rotated counterclockwise sufficiently to again allow pawl 103 to engage the slots 99. Entry of the pawl 103 into the slot 99 whenever the pawl and the slot are aligned is quickly attained due to the force exerted upon the pawl by the compressed spring 104.

A detailed description of one complete cycle of operation of the ice maker of this invention will now be described. Whenever reference is made to the direction of rotation of any of the ice maker parts, that is, clockwise or counterclockwise, the part or parts are to be considered as being viewed from the front of the ice maker or as they would appear in FIGURE 1.

For purposes of explanation, it will be assumed that the mold has ejected a plurality of ice bodies and has just returned to its horizontal position. Under this condition, which is shown in FIGURES 8, 9 and 10, the thermal motor 43 is in its cold, retracted condition whereupon front finger 49 is forward of and out of engagement with the front surface 63 of the cam and rear finger 56 is in its forward position and in engagement with the rear surface 64 of the cam. More specifically, the square abutting surface 61 of finger 56 engages the base 129 of projection D. This engagement of finger 56 with projection D actually occurs soon after the shaft and hence the mold begins its counterclockwise rotation back to the horizontal position, and because of this engagement, the cam 65 is caused to rotate with the shaft and consequently wind the internal torsion spring 66 and thereafter to cause the outlet valve cam surface G to depress hinged lever arm 80 to open the outlet water valve 201 and permit water to enter the mold. When the mold moves counterclockwise to its horizontal position, it is prevented from going beyond the horizontal position because of the interference of mold frame 35 with the forwardly extending stop 132 on housing 19 as seen in FIGURE 2.

The heat of the incoming water causes the thermal motor 43, which senses the mold temperature, to assume its expanded, rearmost position, whereupon movable member 44 through push rod 45 causes finger 49 to move rearwardly and into abutment with the front surface 63 of the cam and also causes finger 56 to likewise move rearwardly sufficiently to disengage this finger from the base 129 of projection D located on the rear surface 64 of the cam. This disengagement of finger 56 from projection D allows the previously wound torsion spring 66 to rotate the cam 65 clockwise until the abutting surface 59 of front finger 49 engages the base portion 130 of projection C located on the front surface 63 of the cam. This rotational movement of the cam 65, which is about 50°, allows the outlet water valve cam surface G to rotate away from hinged lever arm 80 and thus allow outlet valve 201 to become closed. As seen in FIGURES 11, 12 and 13, both inlet 200 and outlet 201 valves are closed during this reset period of the cycle. In moving the cam this first 50°, the torsion spring 66 is only partially unwound and is capable of moving the cam clockwise an additional amount at a later time.

Under the influence of the sub-freezing air being provided to chamber 11 by the fan, the water in the mold freezes and the thermal motor 43 senses a cold temperature and allows a movable member 44 to move to its forwardmost position. When this happens, abutting surface 59 of finger 49 moves forwardly away from the front surface 63 of the cam sufficiently to allow the finger 49 to clear the base portion 130 of projection C. At the same time, the finger 56 has also moved forwardly into engagement with the rear surface 64 of the cam 65. The position of the fingers with respect to the cam at this time is shown in FIGURES 14, 15 and 16. Disengagement of finger 49 with projection C allows the cam to again move counterclockwise due to the forces imparted upon it by partially wound torsion spring 66. The cam rotates clockwise some 70° until projection E, located on the rear surface 64 of the cam strikes the short lug Y which extends forwardly from the front surface of the mount plate 20. As seen in FIGURES 14, 15 and 16, rotation of the cam 65 to this position causes the inlet water valve cam surface F to depress the hinged lever arm 78 and thus plunger 77 whereby the inlet water valve 200 is opened and water commences to flow from the main water supply line into the water storage chamber 74.

As explained previously, entry of water into the water storage chamber 74 causes the shaft 22 to be driven clockwise and hence moves the mold toward the vertical dumping position. During this clockwise rotation of the shaft 22, movement of the cam 65 is prevented because of the interference of projection E with lug Y, but at this same time fingers 49 and 56 do rotate. Since finger 49 is not in engagement with the front surface 63 of the cam it will not interfere with projection C during this rotation. However, finger 56 does abut the rear surface 64 of the cam but it guided over and in back of the projection D because of the camming action between inclined surface 62 of the finger 56 and the inclined surface 124 of projection D. This rotation of the finger 56 beyond the position of projection D is best seen in FIGURE 13. When the shaft has rotated clockwise about 128° from the horizontal position, the pawl 103 is disengaged from the drive gear 91, as previously described, and the shaft, due to the forces exerted upon it by the mold return spring 108, rotates counterclockwise back to the horizontal position. Soon after this counterclockwise rotation of the shaft 22 begins, the abutment 61 of finger 56 engages the base portion 129 of projection D which causes the cam 65 to also rotate counterclockwise with the shaft, the effect being that the torsion spring 66 is rewound and the valve arrangement is reversed, that is, the inlet water valve 200 is closed and the outlet water valve 201 is opened. Thus the mold is filled with water and the cycle is ready to be repeated.

During each cycle of the ice maker assembly 17, the control arm wire 125 rotates out of the storage receptacle 127 and subsequently re-enters the receptacle to senes a new level of ice bodies therein. As described previously, movement of the control arm is effected by rotation of the control arm shaft 115 which is in turn rotated by movement of the lifting arm 118 as it moves against the cam surface 119. Thus, whenever the drive gear 91 moves clockwise to move the mold away from the horizontal position, the cam surface 119, because of its association with lifting arm 118 and control arm shaft 115, causes control arm wire 125 to move counterclockwise, as seen in FIGURE 1, out of the storage receptacle 127. When the control arm has reached its uppermost position, the free end of flat spring 120 rests against the lower surface of lug X and terminates adjacent the surface of cam 65 as best seen in the full line position of FIGURE 18. When the pawl 103 disengages from the drive gear 91 and the mold returns to the horizontal position, the drive gear and its associated parts remain stationary and hence the control arm also remains in its uppermost position. During this counterclockwise rotation of the shaft 22 and cam 65, the inclined surface 140 of the outlet valve cam surface G is such that the flat spring 120 is momentarily deflected downwardly to allow the outlet valve cam surface G and hence the cam 65 to rotate counterclockwise past the position of the spring 120. During normal operation, when the drive gear 91 rotates counterclockwise due to the passage of water from the storage chamber 74 to the mold 27, the lifting arm 118 in association with cam surface 119 on the drive gear rotates clockwise which in turn causes the control arm wire 125 to also rotate clockwise to its lowermost position within the storage receptacle 127. At this time the flat spring 120 rotates substantially away from the surface of the cam 65 to the dotted line position shown in FIGURE 9. If, on the other hand, the control arm in attempting to move clockwise to its lowermost position is impeded by a preselected level of ice bodies within the receptacle, the flat spring 120 is prevented from rotating away from the surface of the cam 65, that is, it remains in the full line position shown in FIGURES 9 and 18. Under these conditions when the thermal motor 43 resets and allows the cam to rotate from the position of FIGURE 8 toward the reset position of FIGURE 11, the sharp cut-off portion 131 of the outlet water valve cam surface G interferes with the free end of flat spring 120 as shown in FIGURE 20. This interference occurs before the cam reaches the 50° or reset position of FIGURE 11. Flat spring 120 is prevented from being deflected by the forces of cam surface G exerted upon it because of its abutment with lug X. This abutment of spring 120 against lug X in effect substantially reduces the moment arm through which the spring can work, and hence the force required by G to deflect the flat spring 120 in a clockwise direction, as seen in FIGURE 20, is greater than can be supplied by spring 66. Thus when the cam, after ice freezing has been completed, attempts to move to the position of FIGURE 14, it is prevented from doing so and therefore, the inlet water valve 200 is prevented from opening and consequently the ice ejection portion of the cycle cannot be initiated and operation of the ice maker is suspended.

As soon as the user has removed a quantity of ice bodies from the storage receptacle 127, the control arm wire 125 moves clockwise, as seen in FIGURE 1, downwardly into the receptacle due to the using of spring 137. The force exerted on the control arm shaft 115 by torsion spring 137, provided no ice bodies interfere with control arm wire 125, is great enough to bend flat spring 120 until its free end recedes from between the portion 121 of cam surface G and lug X to thereby allow the cam 65 to continue its rotation until it fully reaches the reset position of FIGURE 11. If, at this time, the water in the mold is frozen, the latch arms 55 and 47 are all the way forward and the cam is permitted to rotate an additional 70° to the position of FIGURE 14 to thereby open the inlet water valve 200 and initiate the ice ejection cycle as previously described. If on the other hand the water in the mold is not frozen, the latch arms 55 and 47 are in a position intermediate their forward and rear positions whereupon the cam 65, because of interference of projection C with abutting surface 59, is not permitted to rotate beyond the reset position of FIGURE 11. Thus by permitting the cam surface G to interfere with spring 120 before it fully reaches the reset position of FIGURE 11, the latching device including latch arms 55 and 47 and thermal motor 43 is allowed to maintain control at all time and therefore precludes the dumping of unfrozen water into the receptacle.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. An apparatus for making ice bodies comprising: a mold for holding a body of water, said mold selectively disposed in a first substantially horizontal position and a second ice releasing position; means for delivering a preselected volume of water to the mold; means for freezing the water within said mold; drive means operated by water pressure from a source of water for the mold for rotating said mold from said first position to said second position; spring biased cam means resiliently connected to said drive means for selective rotation with said drive means; lever means cooperating with said cam means and said water delivery means, said cam means actuating said water delivery means upon contact of said cam means with said lever means; and thermally responsive control means for selectively releasing said cam means to thereby initiate said drive means for rotation of said mold toward said second position and the subsequent release of said ice bodies from said mold.

2. The apparatus of claim 1 including mold return means for rotating said mold from said second position to said first position.

3. The apparatus of claim 2 wherein energy is stored in said cam means during rotation of said mold from said second position to said first position.

4. An apparatus for making ice bodies comprising: a mold for holding a body of water, said mold selectively disposed in a first substantially horizontal position and a second ice releasing position; means for freezing the water within said mold; drive means operated by the pressure of the water to be delivered to the mold for rotating said mold from said first position to said second position; a water storage chamber; first normally closed valve means for controlling the entry of water to said chamber from a water source; second normally closed valve means for controlling the entry of water to said mold from said chamber; first lever means cooperating with said first valve means; second lever means cooperating with said second valve means; spring biased cam means selectively contacting said first and second lever means for operating said first and second valve means; and control means including latch means selectively engaging said cam means, and a thermal motor responsive to the temperature of the contents of said mold, said thermal motor operatively connected to said latch means whereupon reaching a preselected low temperature, said motor causes said latch means to release said cam means for subsequent contact of said first lever means to effect the opening of said first valve means thereby initiating said drive means.

5. An apparatus for making ice bodies comprising: a resilient mold having first and second ends and a central open portion for holding a body of water; means for freezing the water within said mold to form ice bodies; a shaft attached to said first end for rotating said mold between a first substantially horizontal position and a second ice releasing position; shaft support means adjacent said first end; a frame member surrounding said mold and attached thereto only at said second end; and stop means for interrupting the rotation of said frame member and said second end during movement from said first position to said second position wherein the first end of said mold continues to rotate thereby imparting a twisting force to said mold for subsequent release of said ice bodies.

6. The apparatus of claim 5 wherein said stop means are mounted on said shaft support means.

7. The apparatus of claim 5 wherein said mold surrounding frame member is supported by and freely rotatable around said shaft adjacent said first end.

8. An apparatus for making ice bodies comprising: a resilient mold having a first end, a second end and a central open portion, said mold selectively disposed in a first substantially horizontal position and a second ice releasing position; means for delivering a preselected volume of water to the mold; means for freezing the water within said mold; drive means for rotating said mold from said first position to said second position, said drive means including means for increasing the driving torque on said mold as it rotates from said first position to said second position; and stop means for interrupting the rotation of the first end of said mold during movement from said first position to said second position wherein said second end continues to rotate thereby imparting a twisting force to said mold for subsequent release of said ice bodies.

9. The apparatus of claim 8 wherein said drive means includes first gear means for rotating said mold from said first position to a position intermediate said first and second positions, and second gear means for rotating said mold from said intermediate position to said second position, said second gear means producing substantially greater torque than said first gear means.

10. The apparatus of claim 9 wherein the first end of said mold makes contact with said stop means upon reaching said intermediate position.

11. An apparatus for making ice bodies comprising: a mold for holding a body of water, said mold selectively disposed in a first substantially horizontal position and a second ice releasing position; means for delivering a preselected volume of water to the mold; means for freezing the water within said mold; drive means operated by water pressure from a source of water for the mold for rotating said mold from said first position to said second position; spring biased cam means resiliently connected to said drive means for selective rotation with said drive means; lever means cooperating with said cam means and said water delivery means, said cam means actuating said water delivery means upon contact of said cam means with said lever means; a storage receptacle for accumulating released ice bodies; and control means for selectively engaging said cam means to prevent said cam means from contacting said lever means for operation of said water delivery means and said drive means whenever said ice bodies have accumulated to a preselected level within said receptacle thereby terminating the operation of said ice making apparatus.

12. An apparatus for making ice bodies comprising: a resilient mold having a first end, a second end and a central open portion, said mold selectively disposed in a first substantially horizontal position and a second ice releasing position; means for delivering a preselected volume of water to the mold; means for freezing the water within said mold; drive means operated by pressure of the water to be delivered to the mold for rotating said mold from said first position to said second position, and stop means for interrupting the rotation of the first end of said mold during movement from said first position to said second poistion said drive means including gear means for substantially increasing the driving torque on said mold upon contact of the mold with said stop means; wherein said second end continues to rotate thereby imparting a twisting force to said mold for subsequent release of said ice bodies.

References Cited by the Examiner

UNITED STATES PATENTS

| 2,785,253 | 3/57 | Dillman et al. | 200—116 X |
| 2,808,707 | 10/57 | Chace | 62—369 |
| 2,941,379 | 6/60 | Nelson | 62—135 |
| 2,972,897 | 8/60 | Reddi | 178—23 |
| 3,024,618 | 3/62 | Janquart | 62—353 |
| 3,026,684 | 3/62 | Chace | 62—135 |
| 3,048,023 | 8/62 | Taylor | 62—135 |

ROBERT A. O'LEARY, *Primary Examiner.*